(12) United States Patent
Fume

(10) Patent No.: US 11,954,137 B2
(45) Date of Patent: Apr. 9, 2024

(54) DATA GENERATION DEVICE AND DATA GENERATION METHOD

(71) Applicant: KABUSHIKI KAISHA TOSHIBA, Minato-ku (JP)

(72) Inventor: Kosei Fume, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 17/003,328

(22) Filed: Aug. 26, 2020

(65) Prior Publication Data

US 2021/0173857 A1 Jun. 10, 2021

(30) Foreign Application Priority Data

Dec. 9, 2019 (JP) ................................. 2019-222380

(51) Int. Cl.
| | |
|---|---|
| *G06F 17/00* | (2019.01) |
| *G06F 7/00* | (2006.01) |
| *G06F 16/2457* | (2019.01) |
| *G06F 16/332* | (2019.01) |
| *G06F 16/335* | (2019.01) |
| *G06F 18/2113* | (2023.01) |
| *G06F 18/2323* | (2023.01) |

(52) U.S. Cl.
CPC ...... *G06F 16/337* (2019.01); *G06F 16/24578* (2019.01); *G06F 16/3326* (2019.01); *G06F 16/335* (2019.01); *G06F 18/2113* (2023.01); *G06F 18/2323* (2023.01)

(58) Field of Classification Search
CPC .. G06F 16/337; G06F 16/335; G06F 16/3326; G06F 16/24578

USPC ........................................................ 707/706
See application file for complete search history.

(56) References Cited

U.S. PATENT DOCUMENTS

| | | | | | |
|---|---|---|---|---|---|
| 5,983,214 A | * | 11/1999 | Lang | ..................... | G06F 16/337 |
| | | | | | 707/999.001 |
| 6,073,170 A | * | 6/2000 | Sumita | ................. | G06F 16/9535 |
| | | | | | 707/999.01 |

(Continued)

FOREIGN PATENT DOCUMENTS

JP 2016-42373 A 3/2016

OTHER PUBLICATIONS

Akifumi Okuno et al., "Graph Embedded with Shifted Inner Product Similarity and Its Improved Approximation Capability" in arXiv: 1810.03463v2 [stat.ML], Feb. 22, 2019, 20 pages.

*Primary Examiner* — Pavan Mamillapalli
(74) *Attorney, Agent, or Firm* — Oblon, McClelland, Maier & Neustadt, L.L.P.

(57) ABSTRACT

A data generation device according to an embodiment includes one or more processors. The one or more processors classify each of a plurality of users having attributes similar to one another into any one of a plurality of clusters based on user information representing the respective attributes of the users. The one or more processors estimate whether a search result is useful to each of the users based on a similarity between information included in the search result and information representing attributes of the clusters, and output learning data of a ranking model for determining an order of a plurality of the search results, the learning data being data including the search results and estimation information representing whether the search results are useful.

12 Claims, 9 Drawing Sheets

(56) References Cited

U.S. PATENT DOCUMENTS

| | | | | |
|---|---|---|---|---|
| 6,308,175 B1* | 10/2001 | Lang | | G06F 16/9535 |
| | | | | 707/999.005 |
| 6,795,818 B1* | 9/2004 | Lee | | G06F 16/40 |
| | | | | 707/999.005 |
| 11,048,765 B1* | 6/2021 | Paiz | | G06F 16/9535 |
| 2002/0103789 A1* | 8/2002 | Turnbull | | G06F 16/9536 |
| | | | | 707/E17.109 |
| 2002/0107853 A1* | 8/2002 | Hofmann | | G06F 16/335 |
| | | | | 707/E17.059 |
| 2003/0065663 A1* | 4/2003 | Chu | | G06Q 10/10 |
| | | | | 707/999.01 |
| 2004/0210661 A1* | 10/2004 | Thompson | | G06Q 30/02 |
| | | | | 709/228 |
| 2006/0018551 A1* | 1/2006 | Patterson | | G06F 16/313 |
| | | | | 707/E17.084 |
| 2006/0020571 A1* | 1/2006 | Patterson | | G06F 16/345 |
| 2006/0155751 A1* | 7/2006 | Geshwind | | G06F 16/3338 |
| | | | | 707/999.102 |
| 2007/0038603 A1* | 2/2007 | Guha | | G06F 16/9535 |
| | | | | 707/999.003 |
| 2009/0055355 A1* | 2/2009 | Brunner | | G06Q 30/02 |
| | | | | 707/999.003 |
| 2009/0234711 A1* | 9/2009 | Ramer | | G06Q 30/0269 |
| | | | | 705/14.66 |
| 2011/0093459 A1* | 4/2011 | Dong | | G06F 16/9535 |
| | | | | 707/E17.014 |
| 2011/0106850 A1* | 5/2011 | Li | | G06F 16/335 |
| | | | | 707/E17.014 |
| 2013/0124538 A1 | 5/2013 | Lee et al. | | |
| 2013/0297581 A1* | 11/2013 | Ghosh | | G06F 16/951 |
| | | | | 707/706 |
| 2014/0129552 A1* | 5/2014 | Sinha | | G06F 16/24578 |
| | | | | 707/732 |
| 2016/0323398 A1* | 11/2016 | Guo | | H04L 67/535 |
| 2017/0308583 A1* | 10/2017 | Husain | | G06F 16/9024 |
| 2020/0005149 A1* | 1/2020 | Ramanath | | G06F 16/335 |

* cited by examiner

FIG.5

| OCCURRENCE OF CLICKING | QUERY ID | DOCUMENT ID | ATTRIBUTE 1 | ATTRIBUTE 2 | ATTRIBUTE 3 | ATTRIBUTE 4 |
|---|---|---|---|---|---|---|
| 1 | 8 | 2323 | 1 | 0 | ... | ... |
| 0 | 8 | 5321 | 0 | 0 | ... | ... |
| 1 | 8 | 2560 | 0 | 0 | ... | ... |
| 1 | 8 | 3526 | 0 | 1 | ... | ... |
| 0 | 8 | 0892 | 0 | 1 | ... | ... |
| 1 | 8 | 5290 | 0 | 0 | ... | ... |
| 1 | 8 | 5011 | 0 | 0 | ... | ... |
| 0 | 8 | 0112 | 0 | 0 | ... | ... |
| 1 | 8 | 0912 | 0 | 1 | ... | ... |
| 1 | 8 | 5937 | 0 | 0 | ... | ... |
| 1 | 0 | 9667 | 1 | 0 | ... | ... |
| 1 | 0 | 3211 | 0 | 0 | ... | ... |
| 1 | 0 | 8689 | 0 | 0 | ... | ... |
| 0 | 0 | 6609 | 0 | 0 | ... | ... |
| ... | ... | ... | ... | ... | ... | ... |

FIG.7

| No | TITLE | EXPERIENCE | EXPERTISE |
|---|---|---|---|
| 1 | CUTTING ERROR DURING REMOVAL OF EXISTING PIPING IN PIPING REPAIR WORK | A-2 | PIPING |
| 2 | CEMENT SOLIDIFICATION EQUIPMENT WRONG USE OF PIPING MATERIAL | B-3 | PIPING |
| 3 | PIPE CUTTING ERROR | O-1 | PIPING |
| 4 | DAMAGING OF DETECTION PIPE FOR PIPING | K-1 | PIPING AND FITTING |
| 5 | INOPERATIVE STEAM REGULATOR VALVE | F-1 | PIPING |
| 6 | LEAKAGE FROM LOWER PIPE JOINT OF CASING | H-1 | PIPING |
| 7 | DEFECTIVE SELECTION OF PIPE MATERIAL DURING PIPING | F-1 | PIPING (INCL. FITTING) |
| 8 | BURNING OF WASTE CLOTH IN PIPING | J-1 | PIPING AND DUCTING |
| 9 | WATER LEAKAGE FROM PART WHERE PIPING IS NOT LAID | J-2 | PIPING AND DUCTING |
| 10 | WATER LEAKAGE FROM TUBE FOR INSERTION AND WITHDRAWAL | F-6 | PIPING AND DUCTING |

DATA GENERATION DEVICE AND DATA GENERATION METHOD

CROSS-REFERENCE TO RELATED APPLICATIONS

This application is based upon and claims the benefit of priority from Japanese Patent Application No. 2019-222380, filed on Dec. 9, 2019; the entire contents of which are incorporated herein by reference.

FIELD

An embodiment described herein relates generally to a data generation device and a data generation method.

BACKGROUND

Search systems are known that search for documents, and output the documents searched for in an order determined based on, for example, levels of importance. As examples of the search systems, enterprise search systems have been known that achieve searches for various business documents stored in a company.

However, in the conventional technologies, the ordering (ranking) may not be appropriately performed, so that a user may fail to efficiently find necessary documents.

BRIEF DESCRIPTION OF THE DRAWINGS

FIG. 5 is a chart illustrating an example of a data structure of estimation information;
FIG. 7 is a chart illustrating an example of a method for outputting search results.

DETAILED DESCRIPTION

According to one embodiment, a data generation device according to an embodiment includes one or more processors. The one or more processors classify each of a plurality of users having attributes similar to one another into any one of a plurality of clusters based on user information representing the respective attributes of the users. The one or more processors estimate whether a search result is useful to each of the users based on a similarity between information included in the search result and information representing attributes of the clusters, and output learning data of a ranking model for determining an order of a plurality of the search results, the learning data being data including the search results and estimation information representing whether the search results are useful.

The following describes in detail a preferred embodiment of a data generation device according to the present invention.

Unlike general web searching, an enterprise search system such as those described above may not be able to use a weighting method such as page ranking because no explicit link is present between documents. As a result, in a keyword search, a large amount of irrelevant documents may result in search hits, and the relevance of presented ranking is low, so that it may be difficult for a user to search for necessary documents.

In the enterprise search system, the user may be a small enterprise, and the specialized field of the user may be biased. In such a case, applying, for example, a social filter to the search results may lead to a bias or fixation of the search results, and it is difficult to provide a search system useful from the start of operation.

Thus, in the present embodiment, a user model is created by abstracting each of a plurality of users using user information (such as a user profile) representing attributes of the individual user. A similarity between the attributes of the user model and the search results is used to generate learning data for learning a model (ranking model) for ranking the search results.

By using the ranking model obtained through the learning using the thus generated learning data, the search results can be more appropriately ranked according to the attributes of the users, for example, even at the start of operation of the system. As a result, the user can more efficiently find the necessary document.

In the present embodiment, the order of the search results is adjusted by the similarity thereof to the user model obtained by abstracting the attributes of the individual user, and the search results are presented to the user. As a result, documents including unknown keywords or technical terms similar in usage in a context (similar in embedded representation) can be presented as highly ranked search results even if keywords serving as search queries and words or phrases appearing near the keywords do not match.

Figure 1:
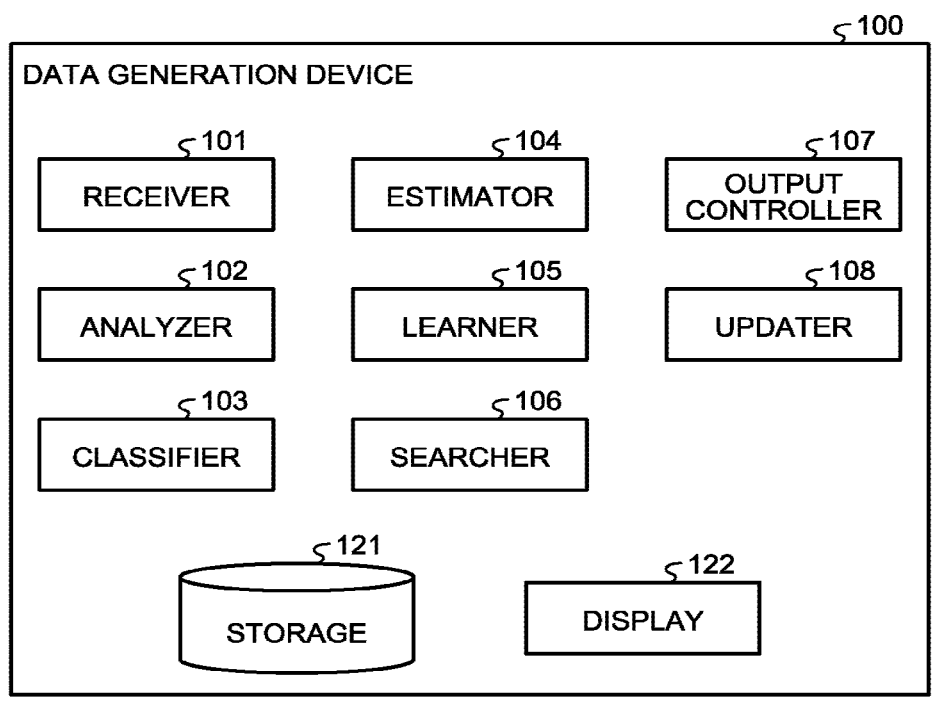
FIG. 1 is a block diagram of a data generation device according to an embodiment.

FIG. 1 is a block diagram illustrating an example of a data generation device 100 according to the present embodiment. As illustrated in FIG. 1, the data generation device 100 includes storage 121, a display 122, a receiver 101, an analyzer 102, a classifier 103, an estimator 104, a learner 105, a searcher 106, an output controller 107, and an updater 108.

The storage 121 stores various types of data used in various types of processing performed by the data generation device 100. The storage 121 stores therein, for example, information (such as the documents) as a target of search processing, the user profile including the attributes of each of the users, and information about the ranking model. Some or all of these pieces of information may be stored in a storage device outside the data generation device 100.

The storage 121 can include any generally used storage media, such as a flash memory, a memory card, a random-access memory (RAM), a hard disk drive (HDD), and an optical disc.

The display 122 is a display device, such as a liquid crystal display, for displaying information. The display 122 displays the information according to the control of the output controller 107.

The receiver 101 receives various types of data to be processed. For example, the receiver 101 receives input of the user profile and the keywords serving as the search queries.

The analyzer 102 performs analysis processing on the documents. For example, the analyzer 102 analyzes the user profile to extract the attributes of the user. The analyzer 102 performs, for example, morphological analysis on information included in the user profile to extract keywords that can serve as the search queries. The extracted keywords are used as the search queries when the search processing is simulated.

If the attributes of the users have already been created from, for example, the user profiles, the already created information may be acquired and used. In this case, the analyzer 102 need not have the function to extract the attributes of the users. The keywords serving as the search queries may be extracted from information (for example, the documents stored in the storage 121) other than the user profiles. Predetermined keywords (for example, keywords designated by an administrator) may be used as the search queries used in the simulation.

The classifier 103 classifies each of the individual users into any one of the user models obtained by abstracting the attributes. For example, the classifier 103 uses the attributes (user profiles) of the individual users to classify the users having the attributes similar to one another into any one of a plurality of clusters. Each of the clusters corresponds to one of the user models obtained by abstracting a plurality of users. The classifier 103 also determines an attribute of each of the clusters. For example, the classifier 103 determines one of the attributes of a plurality of users classified into the cluster, determined to be similar among the users as the attribute of the cluster.

The estimator 104 estimates whether the search results obtained by simulating the search processing are useful to the user, and generates the learning data including estimation information representing an estimation result. For example, the estimator 104 performs the search processing (search simulation) using the search queries extracted by the analyzer 102 as virtual search queries (virtual queries). The estimator 104 estimates whether the search results are useful to the user based on the similarity between information included in the search results of the search simulation and the information representing the attribute of each of the clusters.

The estimation of whether the search results are useful to the user can be interpreted to be the estimation of whether the user selects (clicks) any of the search results. For example, the fact that the user selects any of the search results corresponds to that the search results are useful, and the fact that the user does not select any of the search results corresponds to that the search results are not useful. The estimator 104 estimates, for example, that the user selects any of the search results when the information included in the search results is similar to the information representing the attribute of any one of the clusters.

The estimator 104 outputs the learning data including the search results of the search simulation and the estimation information estimated for the search results. The estimator 104 may randomly change the estimation information estimated by the similarity, and output the learning data including the changed estimation information. For example, the estimator 104 changes a certain randomly selected fraction (for example, 20%) of the estimation information estimated by the similarity. For example, the estimator 104 performs processing to change the estimation information indicating that the search results are useful (selected by the user) to estimation information indicating that the search results are not useful (not selected by the user), and performs processing reverse to this processing.

The learner 105 uses the learning data output by the estimator 104 to learn the ranking model. The ranking model and a learning method may be any model and method. For example, the learner 105 can use a model, such as the eXtreme Gradient Boosting (XGBoost) model, using a decision tree, and a learning method applicable to this model.

The searcher 106 performs the search processing. For example, the searcher 106 performs the search processing for the documents stored in the storage 121 to obtain a plurality of search results, and uses the learned ranking model to determine the order of the search results.

The output controller 107 controls the output of the various types of information used in the various types of processing. For example, the output controller 107 outputs the search results of the search processing in the order determined by the searcher 106. While any method may be used as the output method, examples of the applicable method include a method of displaying the search results on the display 122, a method of outputting the search results to an image forming device such as a printer, and a method of transmitting the search results to an external device through a network (such as the Internet).

The updater 108 performs update processing of the user profiles. For example, the updater 108 estimates a cluster to which the user belongs based on a history of the search processing of information performed by the user, and updates an attribute value of an attribute among the attributes of the estimated cluster that has not been set for the user to an attribute value specified by the user.

The above-described components (the receiver 101, the analyzer 102, the classifier 103, the estimator 104, the learner 105, the searcher 106, the output controller 107 and the updater 108) are implemented by, for example, one or more processors. For example, the above-described components may be implemented by causing a processor such as a central processing unit (CPU) to execute a computer program, that is, by software. The above-described components may be implemented by a processor such as a dedicated integrated circuit (IC), that is, by hardware. The above-described components may be implemented using both software and hardware. When a plurality of processors are used, each of the processors may implement one of the components, or may implement two or more of the components.

The data generation device 100 need not include all the above-described components, and only needs to include at least components required to generate the learning data of the ranking model. The data generation device 100 of the present embodiment includes, for example, the function to learn the ranking model (the learner 105) and the function to perform the search processing using the ranking model (the searcher 106). However, some or all of these functions may be included in one or more other devices.

The data generation device 100 may be physically constituted by one device, or may be physically constituted by a plurality of devices. For example, the data generation device 100 may be built in a cloud environment.

Figure 2:
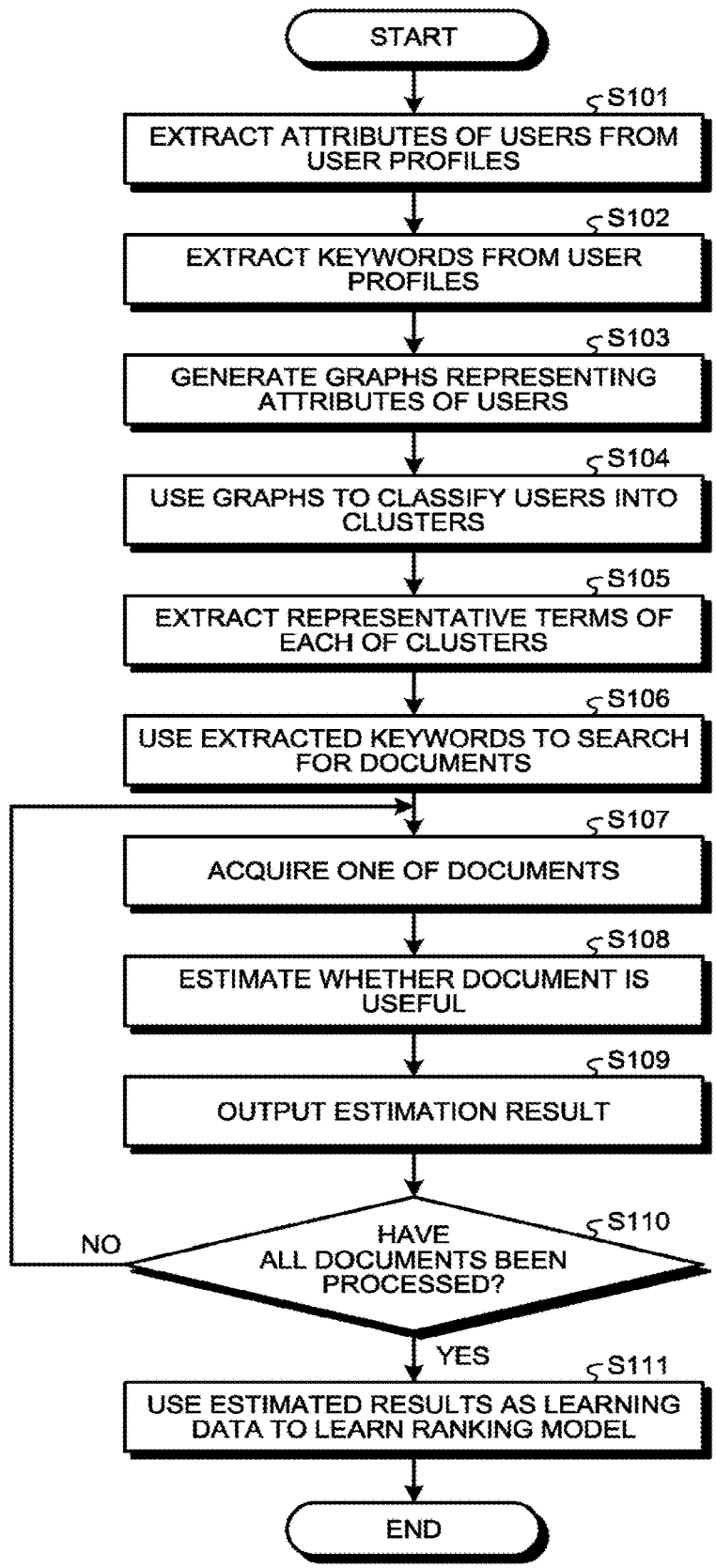
FIG. 2 is a flowchart of data generation processing according to the embodiment.

The following describes data generation processing by the thus configured data generation device 100 according to the present embodiment. FIG. 2 is a flowchart illustrating an example of the data generation processing in the present embodiment.

The analyzer 102 analyzes, for example, the user profiles stored in the storage 121 to extract the attributes of the users (Step S101). The user profiles are each, for example, worker information including information about, for example, a post and a role in operations, expertise, years of experience, a plant where the user works, acquired qualifications, and a history of education received. For example, the analyzer 102 extracts from these profiles predefined attributes and values (attribute values) set for the attributes. The analyzer 102 performs the extraction processing from the user profile of each of the users.

The analyzer 102 further extracts the keywords to be used in the search simulation from the user profiles, and generates a list (virtual query list) of the extracted keywords (Step S102). Each of the user profiles includes information representing the expertise of the user, such as names of the qualifications and a plant name, and in addition, details of operations of pipe welding and turbine installation, and names of equipment and devices about which the user has specialized knowledge. The analyzer 102 performs, for example, the morphological analysis processing and compound word extraction processing to extract the above-mentioned information as keywords from the user profiles.

Figure 3:
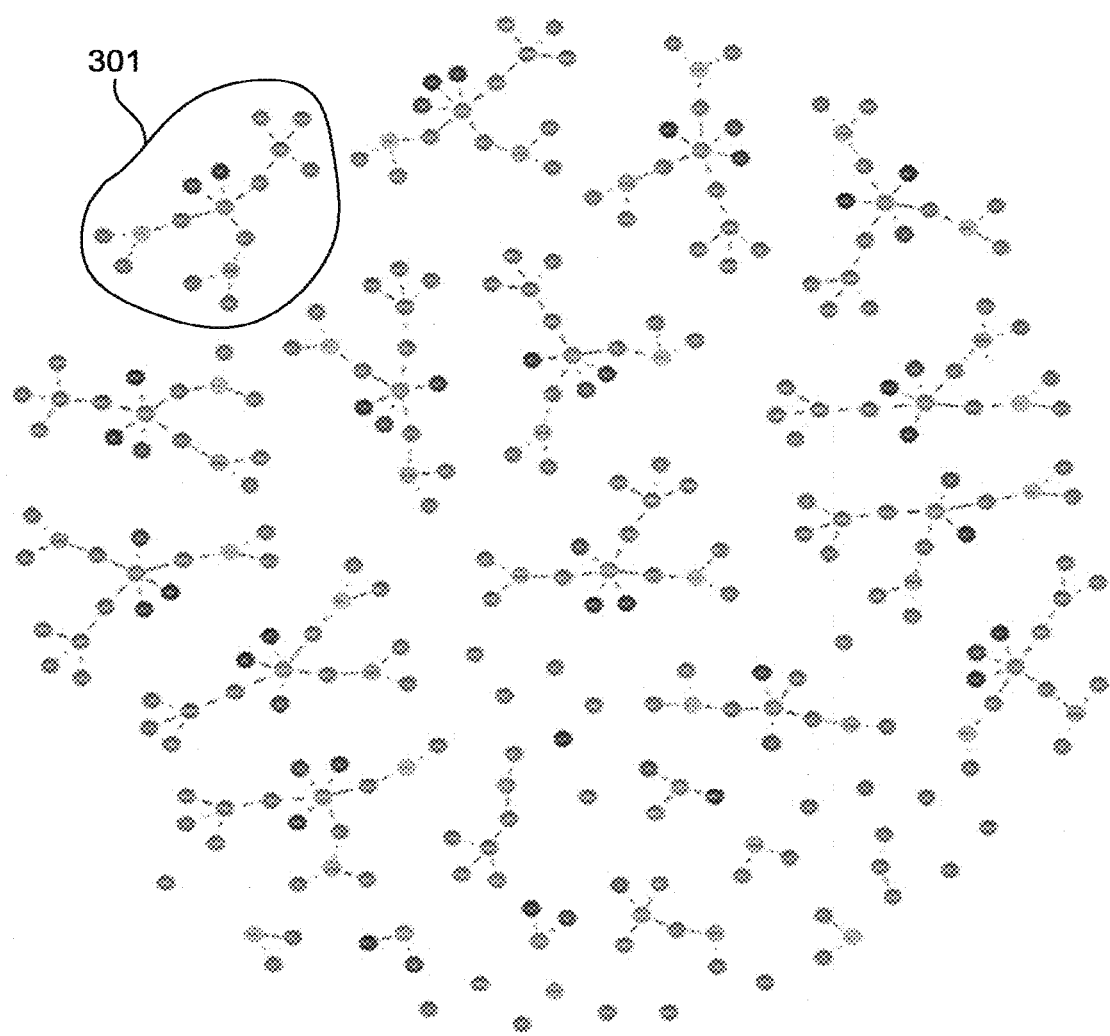
FIG. 3 is a diagram illustrating an example of graphs represented using the Resource Description Framework (RDF)
Figure 4:
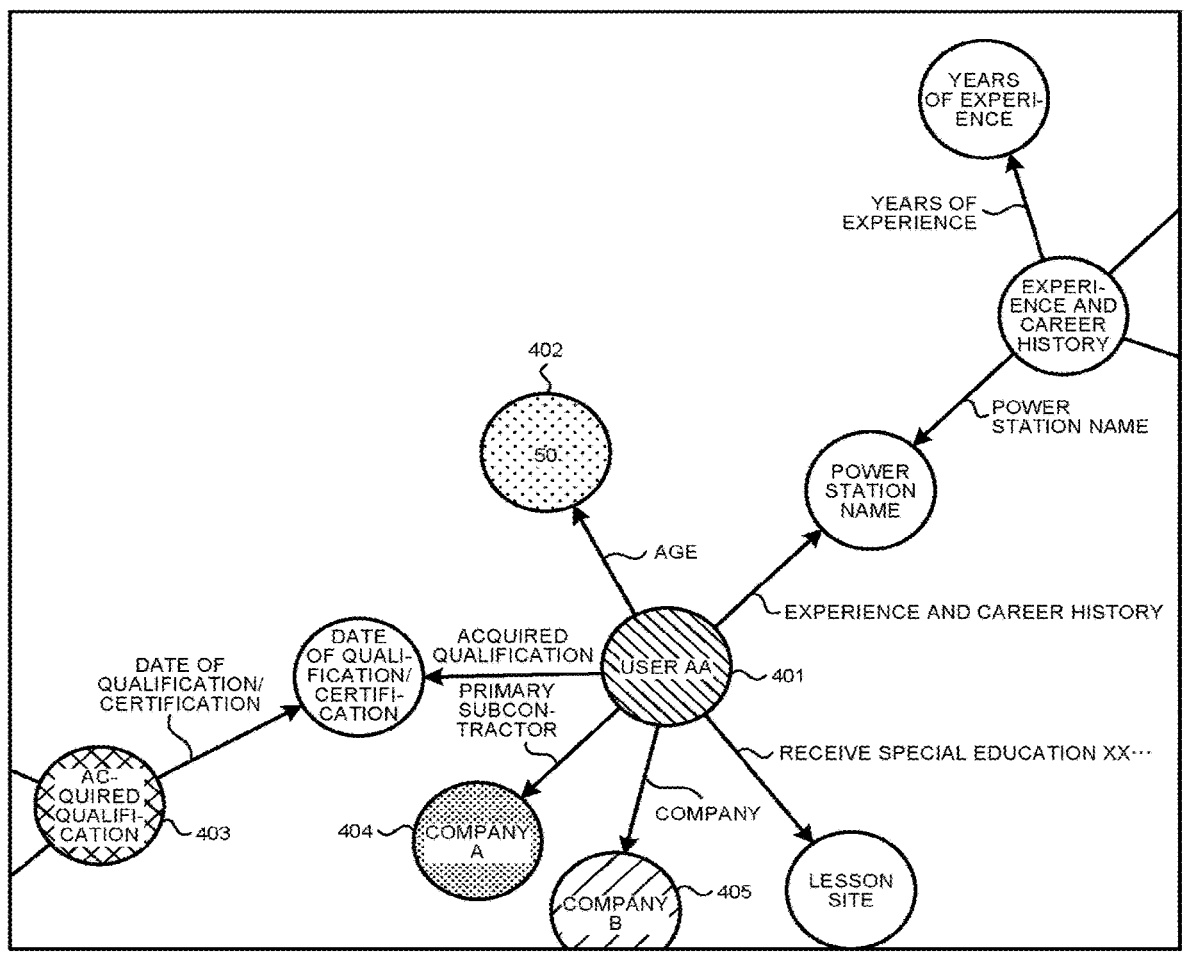
FIG. 4 is a diagram illustrating an example of a graph represented using the RDF.

Then, the classifier 103 generates graphs representing the attributes of the users (Step S103). For example, the classifier 103 acquires names (captions) of the extracted attributes and the attribute values of the attributes, and generates a graph representing relations among the attributes for each of the users. The graph can be represented by, for example, a set of three elements of a subject, a predicate, and an object as a triple representation using the Resource Description Framework (RDF), but is not limited to this example, FIGS. 3 and 4 are diagrams illustrating the graphs represented by the RDF. As illustrated by a graph 301, each closed graph including a plurality of nodes connected to one another at edges thereof represents the attributes of one of the users.

FIG. 4 is a diagram obtained by magnifying the graph of a user. A node 401 is a node corresponding to information (for example, a full name and a user identification (ID)) identifying the user. Nodes 402, 403, 404, and 405 are each a node corresponding to an age, an acquired qualification, a primary subcontractor, and a company of the user of the node 401.

Referring back to FIG. 2, the classifier 103 uses the graphs to classify the users into clusters (Step S104). For example, the classifier 103 classifies (clusters) a plurality of graphs into any one of the clusters such that graphs in which attributes included in each of the graphs are similar to one another belong to the same cluster. The above-described processing can abstract the users having similar attributes into clusters, that is, can collect together a plurality of users in the same cluster according to the similarity. Examples of the method for classifying the users into clusters include the Girvan-Newman algorithm using a top-down approach and the Newman algorithm using a bottom-up approach. A graph embedding method using a neural network (for example, refer to Akifumi Okuno et al., "Graph Embedding with Shifted Inner Product Similarity and Its Improved Approximation Capability", in arXiv: 1810.03463, 22 Feb. 2019) is also proposed.

The classifier 103 further extracts representative terms from each of the abstracted clusters (Step S105). A representative term is a term indicating a feature of each cluster, and corresponds to, for example, a term employed as a hint of the similarity when the cluster is established. For example, assume that a term "person in charge of fire handling" is determined to be similar to a term "fire-prevention manager", and nodes including these keywords have been collected together in the same cluster in the process of bottom-up clustering. In this case, the classifier 103 extracts, as the representative terms, the respective keywords, and morphemes, such as "fire", "handling", "person in charge", "fire-prevention", and "manager", obtained as a result of performing the morphological analysis on the keywords. The extracted representative terms are stored in, for example, the storage 121. The representative terms can be interpreted to be the attribute values representing the attributes of the cluster.

Then, the user information abstracted by the clustering is used to perform the search simulation.

The searcher 106 first uses the virtual query list generated at Step S102 to perform the search processing for the documents stored in the storage 121 (Step S106). For example, the searcher 106 randomly selects one or more keywords included in the virtual query list, and uses the selected keywords as the search queries to search for the documents.

Then, the estimator 104 acquires one of the documents serving as the search results (Step S107). The estimator 104 estimates whether the acquired document is useful to a user (Step S108). The estimator 104 estimates whether the document is useful based on, for example, the similarity between the information representing the attributes of the cluster to which the user assumed to be currently performing the search belongs and information included in the document. Accordingly, the estimator 104 first assumes the user performing the search or the cluster to which the user belongs. The estimator 104 then determines the similarity between the cluster to which the assumed user belongs or the assumed cluster and the document searched for. The estimation processing performed by the estimator 104 will be described in detail later.

The estimator 104 outputs the estimation information representing the estimation result (Step S109). FIG. 5 is a chart illustrating an example of a data structure of the estimation information. As illustrated in FIG. 5, the estimation information includes occurrence of clicking, a query ID, a document ID, and a plurality of attributes (Attribute 1, Attribute 2, Attribute 3, and Attribute 4).

The occurrence of clicking is an example of information representing whether the document is useful, and indicates that the document is useful if clicking has occurred (1) and the document is not useful if clicking has not occurred (0). The query ID is information identifying a search query used in the search simulation. The document ID is information identifying a document searched for. Attributes 1 to 4 are each set to an attribute value of the user assumed in the search simulation, or an attribute value of the cluster to which the assumed user belongs or the assumed cluster.

The estimator 104 generates the estimation information illustrated in FIG. 5 about combinations of various search queries, the assumed users (clusters), and the documents serving as the search results, and stores the estimation information in, for example, the storage 121.

The estimation information in FIG. 5 can be interpreted to be an example of a click log indicating whether the user has clicked the documents. The click log in FIG. 5 is generated on the assumption that the clicking is more likely to occur as the documents include more terms related to the user who has performed the search or users belonging to the same cluster as that of the user.

Referring back to FIG. 2, the estimator 104 determines whether all the documents searched for have been processed (Step S110). If not (No at Step S110), the estimator 104 performs the processing at Step S107 to select the next unprocessed document, and repeats the processing.

If so (Yes at Step S110), the learner 105 uses the estimated estimation information (click log) as the learning data to learn the ranking model (Step S111). The learner 105 uses, for example, a pairwise method to learn which of a document X and a document Y is a better document (more likely to be clicked) for a certain search query.

Figure 6:
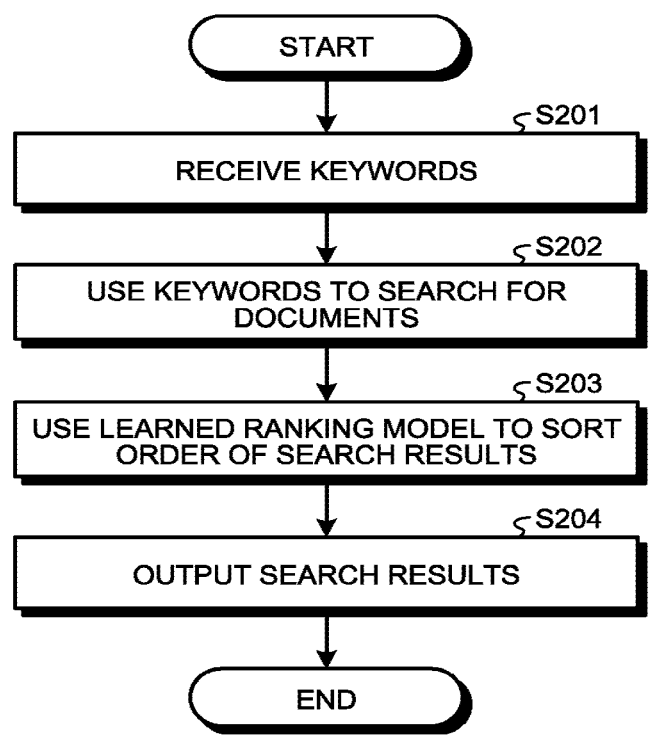
FIG. 6 is a flowchart illustrating an example of search processing according to the embodiment.

The following describes the search processing using the learned ranking model. FIG. 6 is a flowchart illustrating an example of the search processing.

The receiver 101 receives the keywords entered by, for example, the user (Step S201). The searcher 106 uses the received keywords as the search queries to search for the documents stored in, for example, the storage 121 (Step S202). The searcher 106 uses the learned ranking model to sort the N most highly ranked search results that have been searched for (N is an integer of one or higher) (Step S203). In this way, the ranking model is applied to, for example, the N most highly ranked search results searched for, and is used for the sorting processing of the order of the N search results. The ranking model may be configured to be applied when the searcher 106 obtains the N most highly ranked search results. The output controller 107 outputs the search results subjected to the sorting processing (Step S204), and ends the search processing.

FIG. 7 is a chart illustrating an example of a method for outputting the search results. FIG. 7 illustrates settings indicating that the user who has performed the search has an operation experience at a plant called "B-3" and has expertise in "piping" systems as attributes, and illustrates an example of the search results when a search query "piping" is used. FIG. 7 also illustrates an example in which information about "experience" and "expertise" corresponding to the documents is output together with titles of the sorted 10 most highly ranked search results. As illustrated in FIG. 7, the search results more related to the attributes of the user who has performed the search are output at higher ranks.

Figure 8:
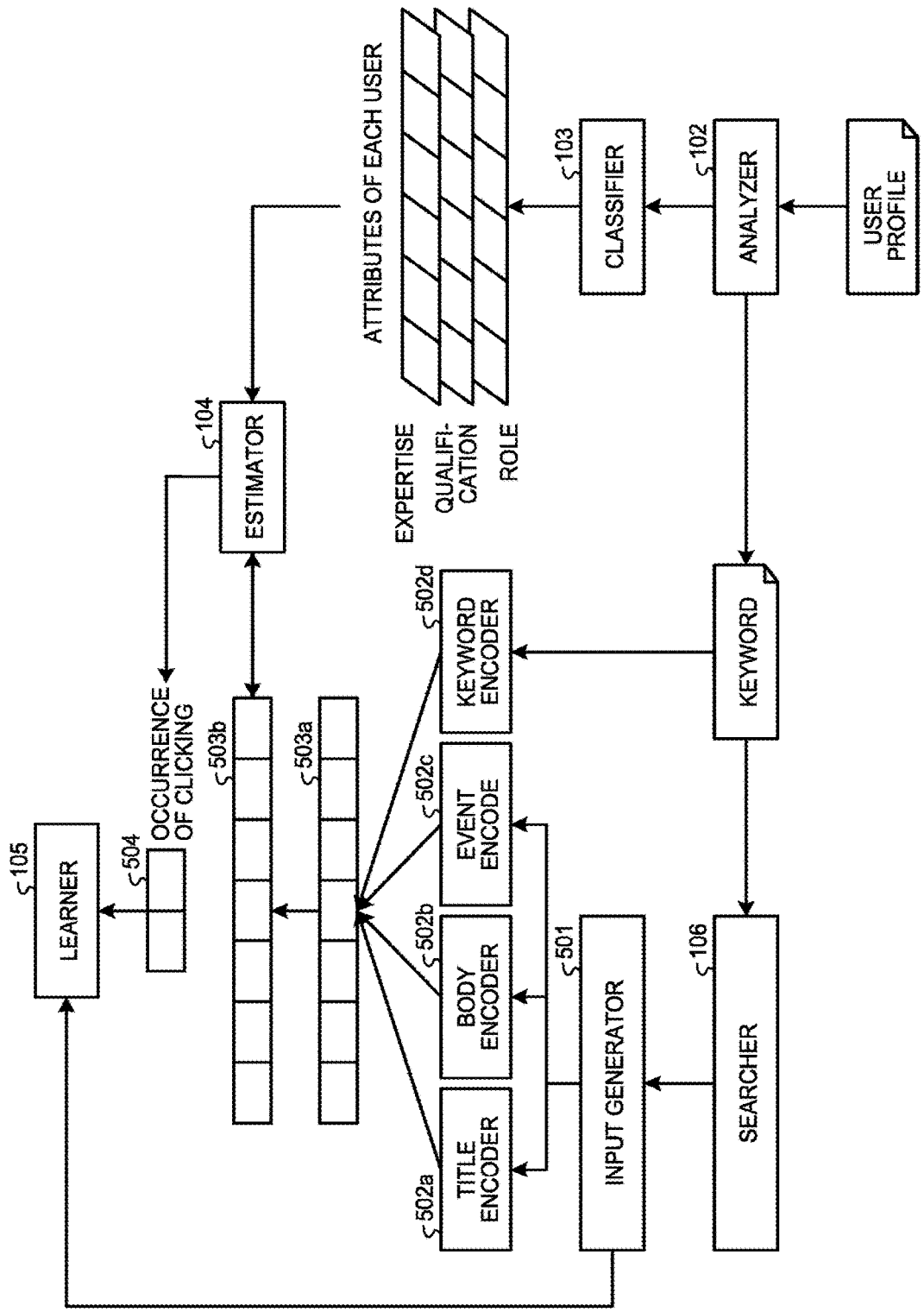
FIG. 8 is a diagram for explaining details of estimation processing according to the embodiment.

The following describes details of the estimation processing performed by the estimator 104. FIG. 8 is a diagram for explaining the details of the estimation processing.

As described above, the classifier 103 generates the user models (clusters) from the attributes of the users extracted by the analysis of the user profiles performed by the analyzer 102, and determines the attributes of each of the user models (clusters). These attributes are used for the estimation processing by the estimator 104. FIG. 8 illustrates an example in which each of the attributes is expressed in a one-hot vector form. The expression form of the attributes is not limited to this form.

The search results obtained by the search simulation using the keywords extracted by the analyzer 102 are used for comparison with the attributes.

The estimator 104 uses a neural network including an input layer 503a and an intermediate layer 503b to perform the estimation processing.

An input generator 501 generates information to be supplied to the neural network from the search results obtained by the searcher 106. For example, the input generator 501 extracts predetermined items from the search results, and uses the extracted items as the information to be supplied to the input layer 503a of the neural network.

For example, in a document about operations performed in a plant, items to be listed may be determined in advance, such as an occurred event (fact) and information indicating details of operations (body). The input generator 501 extracts such items to generate the information to be supplied to the neural network. FIG. 8 illustrates an example in which the title, the body, and the event are extracted as the predetermined items.

A title encoder 502a, a body encoder 502b, an event encoder 502c, and a keyword encoder 502d encode the title, the body, the event, and the keywords used as the search queries, respectively, into a form for supply to the neural network. The neural network receives information in the form of a multi-dimensional (for example, 200-dimensional) vector having the information encoded by the encoders as elements.

The input generator 501, the title encoder 502a, the body encoder 502b, the event encoder 502c, and the keyword encoder 502d illustrated in FIG. 5 may be implemented as some of the functions of the estimator 104.

The neural network is trained so as to output, for example, what type of information the received information is. An output of the intermediate layer 503b is expressed, for example, in a form comparable with the attributes of the user model (such as the one-hot vector form). The estimator 104 compares the output of the intermediate layer 503b with the attributes of the user model to calculate the similarity. The estimator 104 estimates, for example, that the document is useful to the user (clicking has occurred) if the similarity is higher than a threshold, and that the document is not useful to the user (clicking has not occurred) if the similarity is lower than the threshold. The estimator 104 outputs an estimation result 504 estimated in this way.

The learner 105 receives the search results output from the input generator 501 and the estimation result 504 for the search results as the learning data.

The estimation processing by the estimator 104 is not limited to the method illustrated in FIG. 8. For example, estimator 104 may be configured to receive also the attributes of the user model in addition to the above-described information, and perform the estimation processing using the neural network trained so as to output whether the clicking has occurred.

A function may be provided to allow, for example, the administrator managing the search system to control the output order of the search results. For example, the receiver 101 receives input of information specified by the user (such as the manager) as a weight to be given to the generated learning data. The estimator 104 outputs the learning data including the specified weight. The learner 105 learns the ranking model so as to place a search result (second search result) having a larger value of the weight than that of another search result (first search result) in a position earlier in order than the first search result.

The number of pieces of the learning data specified by the administrator may be configured to be increased. In this case, as the ranking model, a model is used that is trained such that increasing the number of pieces of the learning data raises the rank of the corresponding search result.

The following describes the update processing of the user profiles by the updater 108.

For example, the worker information assumed as the user profiles may not be correctly created due to, for example, frequent switch of workers and, even if being created, may not be continuously updated thereafter. As a result, a case may occur where at least partial information of the user profiles is lost, and the content thereof becomes insufficient. In such a case, the updater 108 is used to update the user profiles so as to have appropriate content.

Figure 9:
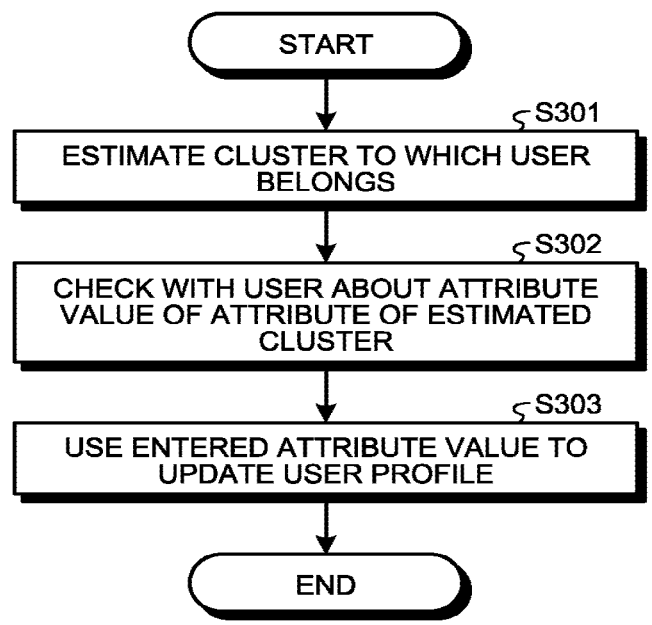
FIG. 9 is a flowchart illustrating an example of update processing according to the embodiment.

FIG. 9 is a flowchart illustrating an example of the update processing. For example, based on the click log (an example of the history of the search processing) indicating which of the search results obtained by each of the users using a certain search query has been browsed in detail, the updater 108 estimates to which cluster the user is closer (to which cluster the user belongs) (Step S301).

If any of the attributes of the estimated cluster has not been specified by the user in the user profile, the updater 108 outputs information prompting input of an attribute value of the attribute to the user (Step S302). For example, the updater 108 causes the display 122 via the output controller 107 to display the information prompting the input of the attribute. The output controller 107 may transmit a message (such as electronic mail) including the information prompting the input of the attribute to the user.

If the user has entered the attribute value in response to the output information, the updater 108 uses the entered attribute value to update the user profile (Step S303).

With such a function, if the user profile of the user is insufficient, the update of the user profile can be prompted to improve the user profile.

The searcher 106 may be configured to perform the search processing on the assumption that the user belongs to the cluster estimated by the updater 108.

As described above, according to the present embodiment, the user profiles stored in advance are used. As a result, even if operations and applications, in particular, are specialized in a certain area, the search results in accordance with characteristics of the users and more suitable for the users can be presented at higher ranks from the start of operation of the search system.

Figure 10:
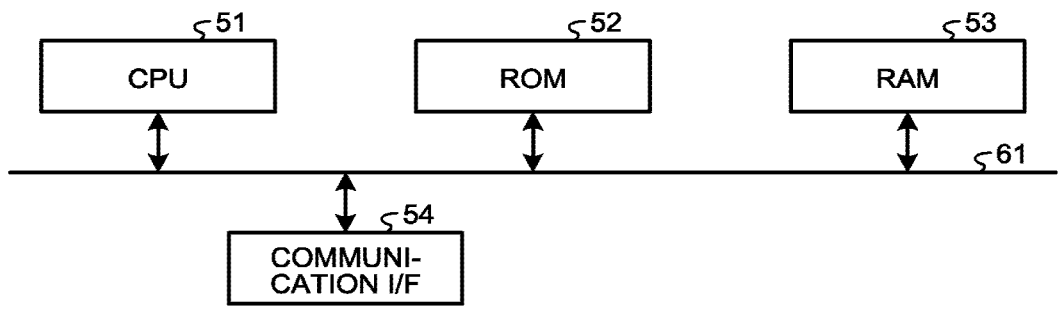
FIG. 10 is a hardware configuration diagram of the data generation device according to the embodiment.

The following describes a hardware configuration of the data generation device according to the present embodiment, using FIG. 10. FIG. 10 is an explanatory diagram illustrating the hardware configuration of the data generation device according to the present embodiment.

The data generation device according to the present embodiment includes a control device such as a central processing unit 51, storage devices such as a read-only memory (ROM) 52 and a random-access memory (RAM) 53, a communication interface (I/F) 54 for connecting to the Internet to perform communication, and a bus 61 for connecting the components.

A computer program to be executed by the data generation device according to the present embodiment is provided by being incorporated in advance in, for example, the ROM 52.

The computer program to be executed by the data generation device according to the present embodiment may be provided as a computer program product by being recorded as a file in an installable format or an executable format on a computer-readable recording medium, such as a compact disc read-only memory (CD-ROM), a flexible disk (FD), a compact disc-recordable (CD-R), or a digital versatile disc (DVD).

Further alternatively, the computer program to be executed by the data generation device according to the present embodiment may be provided by being stored on a computer connected to a network such as the Internet, and downloaded through the network. The computer program to be executed by the data generation device according to the present embodiment may also be provided or distributed through a network such as the Internet.

The computer program to be executed by the data generation device according to the present embodiment can cause a computer to serve as the components of the data generation device described above. On this computer, the CPU 51 can read the computer program from a computer-readable storage medium into a main memory, and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data generation device comprising:
processing circuitry configured to:
classify each of a plurality of users having attributes similar to one another into one of a plurality of clusters based on user information representing the respective attributes of the users;
perform a first search processing using a first search query that includes one or more keywords extracted from the user information to obtain one or more first search results;
estimate whether the users select each of the first search results based on a similarity between each of the first search results and information representing attributes of the clusters, and generating estimation information representing whether the users select each of the first search results;
generate learning data of a ranking model that determines an order of a plurality of second search results, the learning data including the first search results and the estimation information;
train the ranking model using the learning data;
perform a third search processing using a third search query that includes one or more received keywords to obtain a plurality of third search results;
determine the order of the third search results using the ranking model that is trained using the learning data; and
output the third search results in the order that is determined using the ranking model.

2. The data generation device according to claim 1, wherein the processing circuitry is configured to determine, for each of the clusters, one of the attributes of the users classified into the cluster determined to be similar among the users as an attribute of the cluster.

3. The data generation device according to claim 1, wherein
the processing circuitry is configured to estimate that the users select each of the first search results when the each of the first search results is similar to the information representing the attributes of the clusters.

4. The data generation device according to claim 1, wherein the processing circuitry is configured to estimate the cluster to which the user belongs based on a history of search processing of information performed by the user, and update an attribute value of an attribute among the attributes of the estimated cluster that has not been set for the user.

5. The data generation device according to claim 1, wherein
the processing circuitry is configured to output the learning data further including a specified weight, and
the processing circuitry is configured to train the ranking model so as to place a fourth search result among the first search results having a larger value of the weight than that of a fifth search result among the first search results in a position earlier in order than the fourth search result.

6. The data generation device according to claim 1, wherein the processing circuitry is configured to randomly change the estimation information, and output the learning data including the changed estimation information.

7. The data generation device according to claim 1, wherein the processing circuitry is configured to perform morphological analysis on the user information to extract the one or more keywords.

8. The data generation device according to claim 1, wherein the processing circuitry is configured to perform classification of the plurality of users, the first search processing, and generation of the learning data before performing the third search processing.

9. The data generation device according to claim 1, wherein
the first search query includes the one or more keywords extracted from the user information without including one or more keywords inputted by a user, and
the third search query includes the one or more received keywords including the one or more keywords inputted by the user.

10. The data generation device according to claim 1, wherein the processing circuitry is configured to:
input each of the first search results as input-information to a neural network, the neural network being trained so as to output output-information indicating a type of the input-information,
obtain the output-information output from the neural network,
estimate whether the users select each of the first search results based on the output-information.

11. The data generation device according to claim 10, wherein
the output-information is expressed in a form comparable with the information representing attributes of the clusters, and
the processing circuitry is configured to
estimate whether the users select each of the first search results based on the similarity between the output-information and the information representing attributes of the clusters.

12. A data generation method comprising:
classifying each of a plurality of users having attributes similar to one another into one of a plurality of clusters based on user information representing the respective attributes of the users;
performing a first search processing using a first search query that includes one or more keywords extracted from the user information to obtain one or more first search results;
estimating whether the users select each of the first search results based on a similarity between each of the first search results and information representing attributes of the clusters;
generating estimation information representing whether the users select each of the first search results;
generating learning data of a ranking model that determines an order of a plurality of second search results, the learning data including the first search results and the estimation information;
training the ranking model using the learning data;
performing a third search processing using a third search query that includes one or more received keywords to obtain a plurality of third search results;
determining the order of the third search results using the ranking model that is trained using the learning data; and
outputting the third search results in the order that is determined using the ranking model.

* * * * *